United States Patent Office 2,702,765
Patented Feb. 22, 1955

2,702,765

METHOD OF SENSITIZING PAPER BY FORMING SALTS THEREIN

David W. Steinhardt, Dayton, Ohio, assignor to The National Cash Register Company, Dayton, Ohio, a corporation of Maryland No Drawing. Application October 20, 1951,
Serial No. 252,420

3 Claims. (Cl. 117—155)

This invention relates to a process for forming metallic silicate particles in paper, which particles are acid-like in chemical properties, by passing the paper through successive fluid solutions of salt-forming materials at least one of which contains a small amount of a latex binder.

The paper so made is adapted for use in conjunction with color-reactants applied thereto in printing or writing operations, the metallic silicate material causing the color-reactants to assume a distinctive color on contact therewith. So the color-reactants may make contact with the inorganic salts formed in the paper a rubber-like binder is used, but in small quantity and of such nature that it will not "poison" the adsorbent salts by being adsorbed therein. As an example, a paper impregnated with magnesium silicates will cause the colorless solution of crystal violet lactone dissolved in liquid chlorinated diphenyl and applied thereto to turn to a deep blue color. Crystal violet lactone, which is 3,3 bis(p-dimethylaminophenyl) 6-dimethylamino phthalide, having the structure

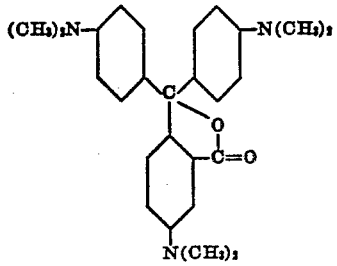

may be made by the method disclosed in United States Patent No. Re. 23,024, which issued on the application of Clyde S. Adams. Other organic color-reactant compounds and other metallic silicates with which the paper may be impregnated by the novel process of this invention will be disclosed later in the specification.

Therefore, it is an object of this invention to provide a process for forming and binding, in paper, particles of metallic silicate material.

It is another object of this invention to provide a process for forming such metallic silicate material in the paper through the reaction of solutions of metallic salts with solutions of silicate materials.

A further object of the invention is to cause such reactions to take place by passing the paper through successive baths of said solutions.

With these and incidental objects in view, the invention includes certain novel features and combinations of steps, a preferred form or embodiment of which is hereinafter described.

In the preferred form of the invention the metallic salt used is magnesium sulfate and the silicate material used is sodium silicate which has approximately 28.7% $SiO_2$ and 8.9% $Na_2O$ content, such being obtainable in solution from the Philadelphia Quartz Company of Philadelphia, as their "N" brand, having a density of 41.0 degrees Baumé. The sodium silicate solution is used with a binder ingredient therein, an anionic butadiene-styrene copolymer latex of 40% butadiene and 60% styrene content by weight, consisting of a dispersion in water of approximately 45% solids content and a pH of 9–10.5. Such may be purchased from the Dow Chemical Company, Midland, Michigan, as "Dow Latex 512K."

First, a bath is made consisting in parts, by weight, of water 87½, the specified sodium silicate solution 12½, and the specified latex 1. A second bath is prepared consisting of a saturated aqueous solution of magnesium sulfate. Next, the paper to be impregnated is passed through the first bath, where it is soaked with the sodium silicate-latex mixture and then is passed through the second bath, where the saturated magnesium sulfate solution comes into contact with the sodium silicate-latex mixture with which the paper is then impregnated, forming, by a chemical reaction, precipitated magnesium silicates which are thus formed in and around the fibers of the paper, said precipitate being in the form of very fine insoluble particles. Care must be taken not to transport an excess amount of the first bath into the second bath and, therefore, pressure rolls may be provided to squeeze out the excess solution or mixture from the paper as it is being transported from the first bath to the second bath. The reaction occurs quickly enough in the second bath so that the paper may be immediately removed therefrom and dried of the moisture, whereupon the paper is ready for use. The dried paper preferably is calendered before use to give it a better writing surface, inasmuch as the surface texture may have been impaired by being subjected to an excess of moisture in the baths. The presence of the precipitated magnesium silicates in and around the paper fibers makes the paper sensitive not only on each surface but also in the interior thereof so that applied color-reactants that soak into the paper will appear of deeper color due to the increased amount of the colored reactant for a given visually observed area.

In a modified form of the invention, the materials of the first and second baths may be applied only to one side of the paper by rollers, if it is decided not to have the other side of the paper sensitized, but in the preferred embodiment the entire paper sheet or strip is immersed in the baths. It will, of course, be apparent that the paper may be immersed in one bath and treated with the other bath only on one side, to obtain the sensitization of the paper only on that side to which it has been subjected to the material of both baths.

The order of the baths may be reversed, although that given is preferred.

The concentrations of ingredients in the baths may be varied considerably from those given, even to the extent of 50% or more. For instance, in the sodium silicate bath the sodium silicate may be used in a concentration of that specified as preferable or it may be used in full strength, that is to say, at a strength of 38%. On the other hand, the magnesium sulfate solution may be less than the saturated solution specified as preferred. The soluble salts useful in this invention may be aluminum, mercury, zinc, calcium, barium, strontium, magnesium, lead, manganous manganese or tin salts or mixtures of them that do not react with each other. The useful salts containing those metallic ions may include the nitrates, chlorates, chlorides, acetates, sulfates, bromides, fluorides, iodates and perchlorates.

Potassium silicate material may be used in place of sodium silicate specified as most desirable, and it is probable that other silicate materials could be used but they are economically unsuitable.

Other organic color-reactant compounds than the specified crystal violet lactone may be used in conjunction with papers sensitized according to the novel process outlined above. Among these are malachite green lactone, which is 3,3 bis(p-dimethylaminophenyl)phthalide, which will react with one or more of the calcium, strontium, magnesium, lead or manganous silicate salts; 3,3 bis(p-dibutylaminophenyl)phthalide, which will react with the calcium, barium, strontium, magnesium, lead, manganous and tin silicates specified to produce a green color; rhodamine-B-N-phenyl lactam, which is 3,7 bis-(diethylamino)-9-(o-carboxyphenyl)xanthene, which will react with the aluminum, mercury, zinc, lead, manganous and tin silicate materials specified to produce a red color; 3,3 bis(p-dimethylaminophenyl)4,5,6,7 tetrachloro phthalide, which will react with zinc, calcium, strontium, magnesium, lead and tin silicate materials, specified to produce a green color; 3,3 bis(p-diethylaminophenyl)6- diethylamino phthalide, which will react with the mercury, zinc, calcium, barium, strontium, magnesium, lead, manganous and tin silicate materials specified to produce a blue color; and N-p-nitrophenylrhodamine-B-lactam, which is xanthene-9 o-benzoic acid, 3,6 bis-diethylamino-9-p-nitroanilino-lactam, which will react with the aluminum, mercury, zinc, lead, manganous and tin silicate materials specified to produce a red color. The crystal violet lactone, specified, will react with the aluminum, mercury, zinc, calcium, barium, strontium, magnesium, lead, manganous and tin silicate materials specified to produce a dark blue color. The above-mentioned organic color-reactant materials are all soluble to some extent in chlorinated diphenyl and related materials and are in that state substantially colorless, but turn to strong colors when applied to paper sensitized by the method disclosed in this application. These are but a few of the compounds known as adsorption color reactants which by mere contact with the silicate material, due to the acid characteristics of said silicate material change from their colorless form to their colored form. The color reactants, with the exception of the lactams, revert to their colorless form on being desorbed from the silicate material as disclosed in my copending application for United States Patent Serial No. 233,255, filed June 23, 1951, now Patent No. 2,672,336, wherein I disclose a method of erasing marks made in accordance with the method disclosed herein on the novel sensitized record material.

If it be desired to fortify the colorless adsorption color-reactant with a colorless dye oxidizable to a colored form, such as benzoyl leuco methylene blue, and in the event that the particular silicate metallic salts are not oxidizing salts, one or the other of the baths may contain a supplementary oxidizing soluble salt, such as sodium chlorate, which by its presence in the paper after it is dry, will oxidize to the colored form any of the oxidizable colorless dye stuffs applied thereto, after a period of time. Potassium chlorate is another suitable oxidizing agent which may be included in one or the other of the baths.

While the form of the invention herein described, is admirably adapted to fulfill the objects primarily stated, it is to be understood that it is not intended to confine the invention to the one form or embodiment herein disclosed, for it is susceptible of embodiment in various other forms.

What is claimed is:

1. The process of sensitizing paper by forming therein, by chemical reaction, particles of metallic silicate solid material which is bound to the paper, including the steps of preparing two aqueous solutions, one being a saturated solution of a water-soluble metallic salt having cations taken from the group consisting of aluminum, mercury, zinc, calcium, barium, strontium, magnesium, lead, manganous manganese, and tin, the other being a solution containing in parts by weight, water—87½ parts, sodium silicate of 41.0 degrees Beaumé—12½ parts, and an anionic butadiene-styrene copolymer latex of 40% butadiene and 60% styrene ratio, by weight, and 45% solids content—1 part, and thereafter treating paper by passing it through said solutions in succession.

2. The process of claim 1 in which the paper is finally dried.

3. The process of claim 1 in which either one of the solutions contains an oxidizing salt taken from the group consisting of sodium chlorate and potassium chlorate.

References Cited in the file of this patent
UNITED STATES PATENTS

| | | |
|---|---|---|
| 298,282 | Brigham | May 6, 1884 |
| 599,030 | Wesener | Feb. 15, 1898 |
| 1,976,946 | Kliefoth | Oct. 16, 1934 |
| 2,073,381 | Sell | Mar. 9, 1937 |
| 2,085,602 | Pohl | June 29, 1937 |
| 2,181,299 | Burgess | Nov. 28, 1939 |